March 25, 1924.
O. B. PERKINS
MOTOR VEHICLE SIGNAL
Filed Sept. 11, 1923
1,488,280
3 Sheets-Sheet 3
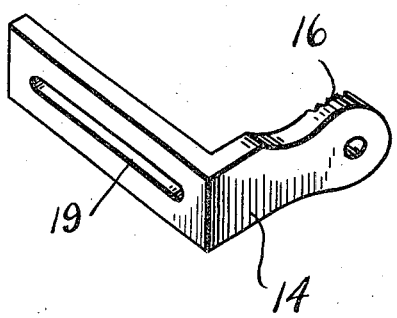
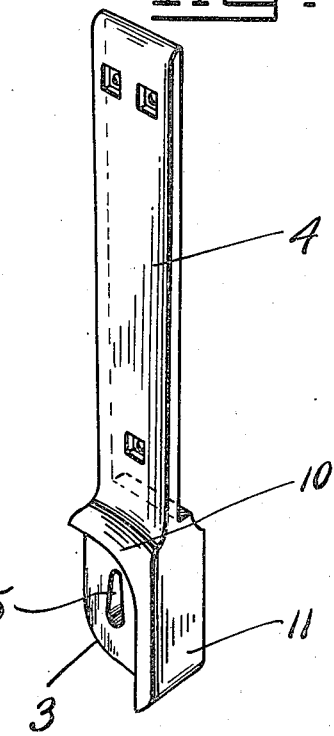
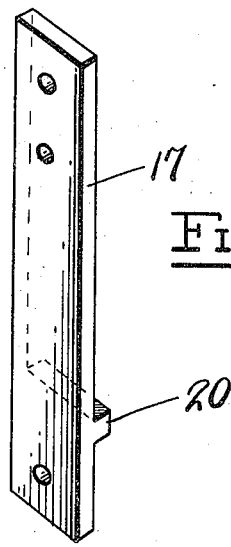
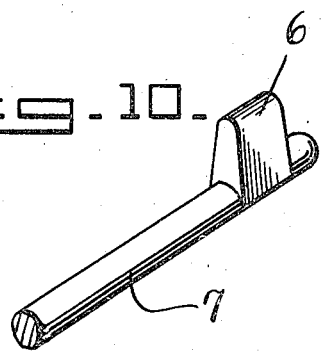
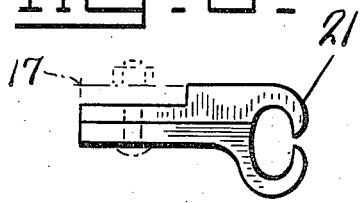
Inventor
Oscar B. Perkins
By L. B. James
Attorney Patented Mar. 25, 1924.

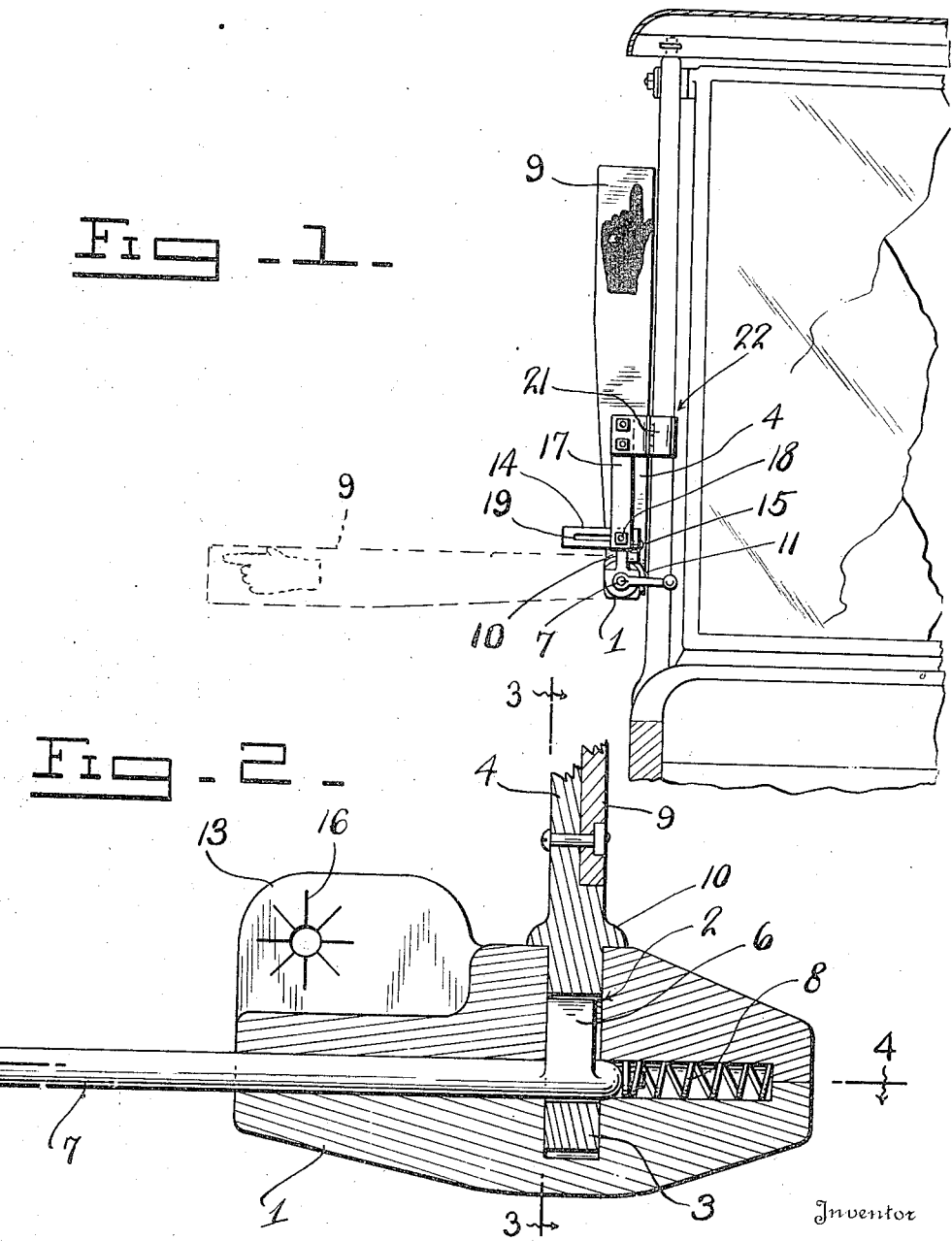

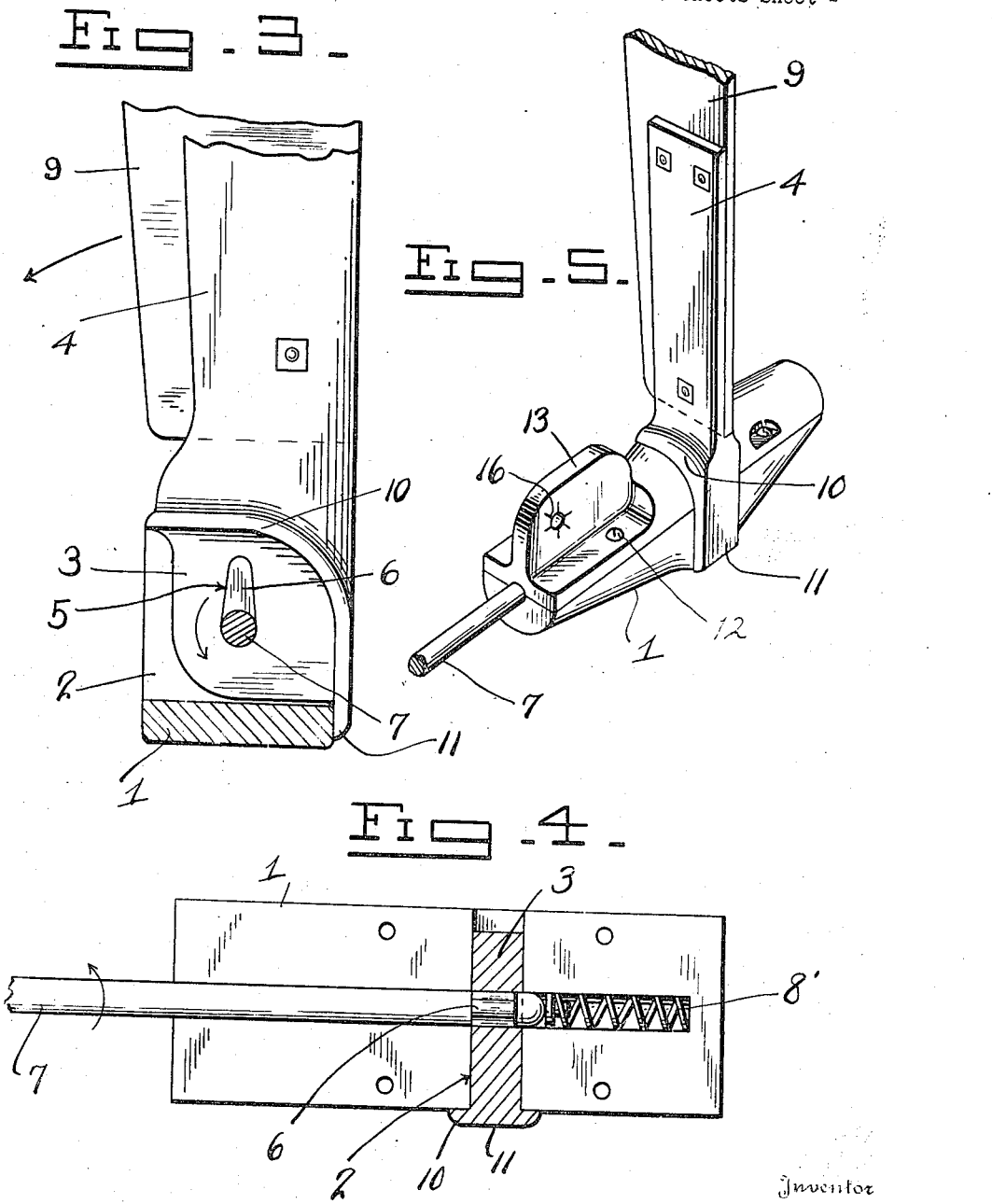

1,488,280

UNITED STATES PATENT OFFICE.

OSCAR B. PERKINS, OF GRAND LEDGE, MICHIGAN.

MOTOR-VEHICLE SIGNAL.

Application filed September 11, 1923. Serial No. 662,131.

*To all whom it may concern:*

Be it known that I, OSCAR B. PERKINS, a citizen of the United States, residing at Grand Ledge, in the county of Eaton and State of Michigan, have invented new and useful Improvements in Motor-Vehicle Signals, of which the following is a specification.

This invention relates to a signal for motor vehicles, the general object of the invention being to provide means for indicating when the driver is to make a turn so as to prevent collisions and accidents.

Another object of the invention is to provide simple means whereby the driver can turn the signal into operative and inoperative position by a partial rotation of a handle member.

A further object of the invention is to provide clamping means for clamping the device to the windshield frame of a vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Fig. 1 is a sectional view through an automobile showing the invention in use.

Fig. 2 is a longitudinal sectional view through the bearing block.

Fig. 3 is a section on line 3—3 of Fig. 2.

Fig. 4 is a section on line 4—4 of Fig. 2.

Fig. 5 is a perspective view of the bearing block, the handle member and a portion of the signal arm.

Fig. 6 is a view of the angle bracket.

Fig. 7 is a view of the clamp supporting plate.

Fig. 8 shows the clamping parts.

Fig. 9 is a perspective view of the arm which carries the signal member.

Fig. 10 is a fragmentary view of the handle member.

In these views 1 indicates a bearing block which is provided with a slot 2 in which works the lower curved part of the signal carrying arm 4. This part of the arm is provided with an elongated slot 5 for receiving the ward 6 of the handle member 7 which has a part located in the bearing block. A spring 8 is arranged in the inner end of the bearing block and bears against the inner end of the handle member so as to force the ward 6 against one wall of the slot 2 so as to frictionally hold the parts in adjusted position. A signal carrying plate 9 is fastened to the arm 4 so that by partly rotating the handle member the signal plate can be moved to a vertical or a horizontal position. When in a vertical position it is partly within the car so that it cannot be seen from the front or rear but when in a horizontal position the signal can be seen and indicates that the driver intends to make a turn. As before stated, the pressure of the spring on the handle member will cause the ward to frictionally engage the wall of the slot and hold the parts in adjusted position. The arm 4 is provided with a flange 10 and a broad lower end 11 which act to prevent twisting movement of the arm and which also act as stops for limiting the movement of the signal. The bearing block is formed of two parts which are connected together by the screws 12 and the upper part is formed with a flat projection 13 to which an angle bracket 14 is adjustably connected by the bolt 15. The abutting faces of the bracket and projection 13 are roughened, as at 16, so as to prevent one part from slipping on the other. A plate 17 is adjustably connected with the bracket by means of the bolt 18 which passes through a slot 19 in the bracket so that the plate is adjustably connected with the bracket. This plate has a flange 20 which engages one edge of the bracket and prevents tilting movement of the plate or bracket. A pair of clamping jaws 21 are bolted to the plate and these jaws are adapted to engage a part of the windshield frame, as shown at 22.

The device is so located on the windshield frame that the handle is within easy reach of the driver so that he can partly rotate the same to move the signal plate in either horizontal or vertical position and thus notify other drivers and pedestrians that he is to make a turn.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device of the class described comprising a bearing block having a slot therein, a signal carrying arm having a part extending through the slot into the bearing block, said part having an elongated opening therein, a handle member extending into the bearing block through a portion of the slot and having a projection thereon engaging the other portion of the slot, a spring in the bearing block for forcing the projection against one wall of the slot, means for clamping the casing to a part of the vehicle and flanges on the arm engaging the bearing block.

2. A device of the class described comprising a bearing block, a signal carrying arm extending into the same and having an elongated opening therein, a handle member extending into the bearing block and passing through the opening and having a projection thereon engaging a part of the opening, an angle bracket adjustably connected with the bearing block, a supporting plate adjustably connected with the bracket and a pair of clamps connected with the supporting plate.

In testimony whereof I affix my signature.

OSCAR B. PERKINS.